Figure 1:
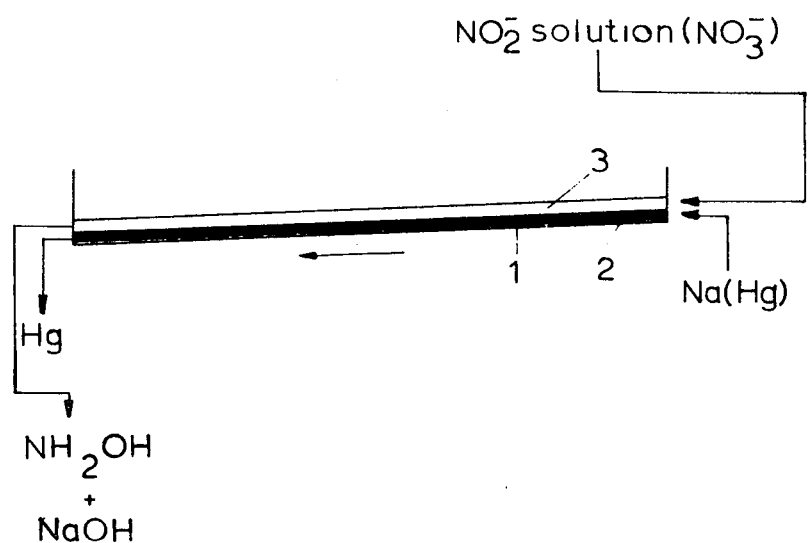

United States Patent [19]

Alfenaar et al.

[11] 3,976,755
[45] Aug. 24, 1976

[54] PROCESS OF REDUCING NITRATE OR NITRILE IONS BY MEANS OF LIQUID AMALGAMS, WITH FORMATION OF HYDROXYLAMINE

[75] Inventors: Marinus Alfenaar, Schinnen; Freddie J. Cremers, Stein, both of Netherlands

[73] Assignee: Stamicarbon B.V., Geleen, Netherlands

[22] Filed: Dec. 26, 1973

[21] Appl. No.: 428,306

[30] Foreign Application Priority Data
Dec. 27, 1972 Netherlands .................... 7217639

[52] U.S. Cl. ............................................. 423/387
[51] Int. Cl.² ...................................... C01B 21/20
[58] Field of Search .................................. 423/387

[56] References Cited
UNITED STATES PATENTS

| | | | |
|---|---|---|---|
| 2,719,778 | 10/1955 | Jockers et al. | 423/387 |
| 3,145,082 | 8/1964 | Rausch et al. | 423/387 |
| 3,821,303 | 6/1974 | Rao et al. | 423/387 |

FOREIGN PATENTS OR APPLICATIONS

| | | | |
|---|---|---|---|
| 768,546 | 10/1967 | Canada | 423/387 |

OTHER PUBLICATIONS

Kirk Othmer, Encyclopedia of Chemical Technology, Second Edition, vol. 18, pp. 564–588.
E. Divers, Chem. Zentralblatt 1899 I p. 99.
Kirk Othmer, Encyclopedia of Chemical Technology, Second Edition, vol. 19, pp. 250–253.

*Primary Examiner*—Earl C. Thomas
*Assistant Examiner*—Wayne A. Langel
*Attorney, Agent, or Firm*—Cushman, Darby & Cushman

[57] ABSTRACT

An improved process is disclosed wherein nitrate or nitrite ions, present in an alkaline solution, are reduced by means of a liquid alkali metal amalgam into hydroxylamine, using a reaction medium which, in addition to water, contains a water-miscible organic solvent for hydroxylamine and alkali nitrate or alkali nitrite.

10 Claims, 4 Drawing Figures

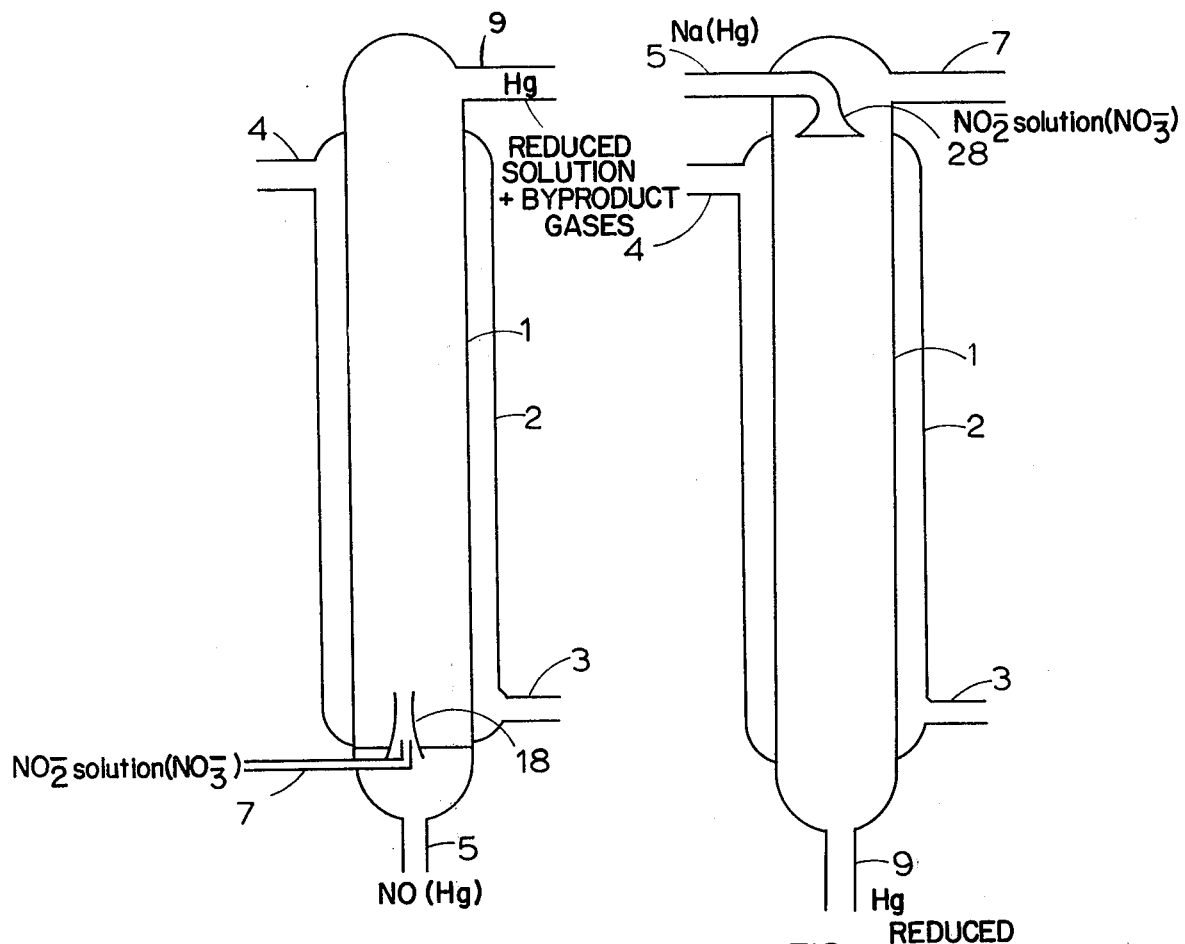

PROCESS OF REDUCING NITRATE OR NITRILE IONS BY MEANS OF LIQUID AMALGAMS, WITH FORMATION OF HYDROXYLAMINE

The present invention relates to the reduction of nitrate and nitrite ions by means of amalgams.

Amalgams, in particular alkali metal amalgams, are produced in large quantities in the electrolysis of chlorine-alkali compounds. By far the greater part of the amalgams thus produced has so far been used for the preparation of hydrogen and hydroxides by reaction with water, with recycle of the resulting mercury to the electrolysis of the chlorine-alkali compound, this leading again to the formation of chlorine and alkali metal amalgam. Economically, there is no objection to using amalgams for other processes than the preparation of hydrogen and hydroxides, e.g. applying it as a reduction agent. Also if the amalgam is used as a reduction agent, such a reduction process will, for economic reasons, have to be coupled to an electrolysis process, so that the amalgam released in the electrolysis is used as reduction agent, and the mercury thus released can be recycled to the electrolysis process.

An example of reduction processes in which amalgams can be used as reduction agents is the reduction of nitrate or nitrite ions to hydroxylamine. Hydroxylamine is a technically important product; it is used on a large scale as a basic material in the oximation of cyclohexanone to cyclohexanone oxime, from which, by a Beckmann rearrangement, ε-caprolactam can next be produced, the basic material for nylon-6. This reduction of nitrate or nitrite ions by means of amalgams is applied on laboratory scale for the preparation of solutions containing hyponitrites, but it is known that in addition to hyponitrites also hydroxylamine is formed.

The reduction of nitrate and nitrite ions by means of amalgams has been extensively studied by E. Divers (see Chem. Zentralblatt 1899 I p. 99).

He found that the formation of sodium hyponitrite and hydroxylamine from sodium nitrite can be varied within wide limits, and that the formation is mainly influenced by the temperature and concentration of the solution.

He reported the maximum hyponitrite yield to be about equivalent to 1/6 of the nitrite originally present, if the nitrite solution is sufficiently concentrated and is not too high in temperature. Strong dilution and/or a rise in temperature may reduce the formation of hyponitrite, even to zero. The formation of hydroxylamine is reported to be equivalent to only 1/300 – 1/11 of the nitrite originally present, and this hydroxylamine formation is promoted by strong dilution and by low temperatures.

The total quantity of $N_2$ and $N_2O$ gases released during the reduction process is reported to be equivalent to 4/5 of the amount of nitrite originally present; the ratio in which these gases are released depends on the temperature; at rising temperature more nitrogen is formed.

The hydroxylamine yield found by Divers is not attractive for a commercial process.

The present invention therefore aims at providing such an improved process and suitable equipment for the realization of this process as will ensure a considerably higher yield of hydroxylamine.

These objectives are reached by application of the following measures:

1. The reaction between the amalgam and the alkaline nitrate or nitrite solution is made to proceed in a reaction medium which also contains a water-miscible organic solvent for hydroxylamine and alkali nitrate or nitrite, by preference in such an amount that there are at least 20 parts by volume of organic solvent to 100 parts by volume of organic solvent plus water.

2. The reaction medium is made to contain a substance which immediately removes the hydroxylamine formed from the reaction medium by entering into a reaction with it. Examples of substances suitable for such reactions are ketones, in particular acetone and cyclohexanone. By preference, these substances will be added in at least the stoichiometric quantity with respect to the amount of hydroxylamine expected to form.

3. The reactants amalgam and solution are made to react with each other in co-current streams, in a continuous process.

4. In a continuous process, the supply of alkali metal, present in the amalgam, and the supply of the nitrate or nitrite ions to be reduced are so controlled that the reactants are made to react in their stoichiometric ratio, i.e. 6 moles of alkali metal, in the form of alkali metal amalgam, per mole of nitrate, or 4 moles of alkali metal, in the form of alkali metal amalgam, per mole of nitrite.

Some suitable water-miscible organic solvents for hydroxylamine and alkali nitrate/nitrite are aliphatic lower alcohols, glycols, and glycol ethers. It should be remarked that the solution of hydroxylamine in an alkaline aqueous solution keeps well, if access of oxygen is excluded.

The influence of the organic solvent can be demonstrated by means of the following comparative experiments, in all of which a solution having a concentration of 0.1 mole of $NaNO_2$ and 2 moles of $NaOH$ per liter, and a temperature of 0°C is fed into the bottom of a 20 cm high column of sodium amalgam containing 0.4 % by weight of Na, the solution rising through the liquid amalgam in the form of droplets or of thin streamlets, and being removed at the top of the column. By moderate stirring in horizontal planes of the amalgam column a good distribution of the rising droplets or streamlets is obtained.

EXPERIMENT 1

If the solvent is water, the efficiency of the conversion to hydroxylamine, in terms of nitrite converted, is $\eta_{NO_2}^- = 20$ %, and in terms of Na converted, $\eta_{Na} = 22$ %.

EXPERIMENT 2

If the solvent used is $CH_3OH$ (80 % by vol.) instead of water, all other conditions remaining the same, the efficiency figures are: $\eta_{NO_2}^- = 48$ % and $\eta_{Na} = 40$ %.

The efficiency can be still further raised if the alkaline nitrite solution contains, in addition to the organic solvent, a compound which, through a coupling reaction with hydroxylamine, immediately removes the hydroxylamine formed; as is known, hydroxylamine reacts readily with ketones and aldehydes. The presence of only a compound that enters into a coupling reaction does not result in a rise of the conversion, as appears from the following comparative experiments, which were performed in the same way as the preceding ones.

EXPERIMENT 3

The solvent for sodium nitrite and NaOH is, again, water; the concentration of nitrite is 0.1 mole/liter, the concentration of NaOH 2.0 moles/liter; however, in this case the solution moreover contains acetone, in a concentration of 0.1 mole/l.

Efficiency $\eta_{NO_2^-} = 18\ \%$ and $\eta_{Na} = 24\ \%$, which shows that there is no question of a rise in efficiency in comparison with Experiment 1 (also in view of the relatively low accuracy of the method for determining $\eta_{Na}$).

EXPERIMENT 4

This experiment was performed in the same way as Experiment 3, but, instead of water, $CH_3OH$ (80 % by vol.) was used. The efficiency now appeared to be: $\eta_{NO_2^-} = 72\ \%$ and $\eta_{Na} = 60\ \%$.

EXPERIMENT 5

This was performed in the same way as Experiment 4, but the coupling agent now used was cyclohexanone. The efficiency proved to be: $\eta_{NO_2^-} = 75\ \%$ and $\eta_{Na} = 90\text{–}95\ \%$, which shows that, in comparison with Expt. 2, the presence — in addition to the organic solvent — of cyclohexanone, which reacts with hydroxylamine to form cyclohexanone oxime, caused the nitrite efficiency to rise from 48 % to 75 %, and even more than doubled the $\eta_{Na}$ figure.

The nature of the organic solvent and the volumetric ratio with respect to water have an influence on the efficiencies that can be reached; but if a comparison is made with a case in which only water is used, it is seen that at the relatively low volumetric ratio of 20 parts of $CH_3OH$ to 100 parts of methyl alcohol plus water there is a considerable rise in efficiency, a maximum being reached if the alcohol content is raised to 80 % by vol., after which the efficiency falls off again; also if ethyl alcohol or other alcohols are used instead of methyl alcohol, higher yields are obtained than with only water as the solvent, but application of 80 % by vol. of methyl alcohol gives the best result, as shown by the following table, which relates to experiments carried out in the same way as Expts. 3 and 4. The solution that was contacted with the Na amalgam contained:

0.1 mole of $NaNO_2$/liter
2 moles of NaOH/liter
0.1 mole of cyclohexanone/liter,
and only the composition of the solvent was varied.

Table

| solvent | efficiency $\eta NO_2^-$ | $\eta Na$ |
|---|---|---|
| 100 vol. % $H_2O$ | 20 | 30 |
| 20 vol. % $CH_3OH$/80 vol. % $H_2O$ | 34 | 44 |
| 40 vol. % $CH_3OH$/60 vol. % $H_2O$ | 59 | 45 |
| 60 vol. % $CH_3OH$/40 vol. % $H_2O$ | 62 | 54 |
| 70 vol. % $CH_3OH$/30 vol. % $H_2O$ | 72 | 65–70 |
| 80 vol. % $CH_3OH$/20 vol. % $H_2O$ | 75 | 90–95 |
| 90 vol. % $CH_3OH$/10 vol. % $H_2O$ | 60 | 55 |
| 80 vol. % $C_2H_5OH$/20 vol. % $H_2O$ | 80 | 80 |
| 80 vol. % $CH_3OCH_2CH_2OH$/20 vol. % $H_2O$ | 52 | 43 |
| 14 vol. % sulfolane $(CH_2)_4SO_2$ – 86 vol. % $H_2O$ | 40 | 35 |

In the reduction of nitrite ions or nitrate ions to hydroxylamine by means of liquid amalgam, the conversion efficiency is strongly dependent on the temperature.

The highest conversion efficiencies are obtained at low temperature (around 0°C); when the temperature is raised, the efficiency drops considerably; it has, for instance, been found that an efficiency $\eta_{Na} = 90\ \%$ at 0°C drops to $\eta_{Na} = 42\ \%$ at 45°C.

In practice, the cost of the cooling required to carry out a reaction at 0°C is very high; in most cases it will be desirable to have a reaction take place at a temperature of at least 40°C, so that the heat generated can be removed cheaply, by means of ordinary cooling water. Therefore, for a process to be carried out on a technical scale, the advantage of the higher efficiency obtained by applying lower temperatures, and the cost involved, will have to be weighed against the disadvantage of the lower efficiency reached at temperatures of 40°C or over, which is attended with the advantage of very low cooling expenses.

It has further been found - in parallel with what was observed by E. Divers - that a low nitrate or nitrite ion concentration raises the yield. Because of the presence of the organic solvent the nitrite concentration is already limited, so that partly for this reason alone the nitrite concentration in the solution will be low. Preference is given to starting solutions having a molar nitrite content of 0.05–0.2, the molar alkali concentration being preferably kept at 1–5.

The conversion is also influenced by the way in which the two reactants, the solution containing nitrate or nitrite and the liquid amalgam, are contacted with each other.

The amalgam can be present as the continuous or as the disperse phase, but in both cases it is necessary for the amalgam and the solution to be contacted in co-current relation, in which way the correct ratio between the concentration of the nitrate or nitrite ions to be reduced and the concentration of the alkali metal in the amalgam can be kept up at the interface between solution and amalgam. The supply of the ions to be reduced must be in equilibrium with the supply of the alkali metal, which means that for every mole of nitrate or nitrite there should be available 6 and 4 moles, respectively, of alkali metal.

If the supply of alkali metal is insufficient, $N_2O$ and $N_2$ will be formed, whereas an oversupply of this metal will cause more $NH_3$ and $H_2$ to be formed.

The decrease of the efficiency at non-optimum ratios between the concentrations of the nitrite ions to be reduced and the alkali metal appears from the following comparative experiments in which amalgam containing 0.5 % by weight of Na is sprayed in a reactor, and an emulsion of amalgam droplets in nitrite-containing solution flows through the reactor. The solution contained per liter 0.1 mole of $NaNO_2$, 2 moles of NaOH, 0.1 mole of cyclohexanone, dissolved in a methanol-water mixture consisting of 80 parts by vol. of $CH_3OH$ and 20 parts by vol. of $H_2O$. The temperature was maintained at 10°C.

EXPERIMENT 6

The supply of the nitrite-containing solution was so adjusted with respect to the supply of the amalgam that 4 atoms of Na were available per mole of nitrite.
Result: $\eta_{NO_2^-} = 63\ \%;\ \eta_{Na} = 75\ \%$.

EXPERIMENT 7

Same as Expt. 6, but now with 8 atoms of Na being available per mole of nitrite.
Result: $\eta_{NO_2^-} = 65\ \%;\ \eta_{Na} = 66\ \%$.

EXPERIMENT 8

Same as Expts. 5 and 6, but with 2 atoms of Na being available per mole of nitrite.

Result: $\eta_{NO_2^-} = 43\%$; $\eta_{Na} = 55\%$.

Some reactors suitable for use in realizing the process are shown, by way of example, in FIGS. 1, 2, 3 and 4.

In the embodiment according to FIG. 1 the reactor consists of a slightly slantingly disposed tank with a flat bottom (1). On this bottom there is flowing a layer of amalgam (2), and on this layer of amalgam moves a layer (3) of an aqueous nitrate or nitrite solution. The reaction between amalgam and aqueous solution takes place while these layers move, so that eventually a stream of mercury and an aqueous hydroxylamine-containing solution are removed.

In this mode of realization the heat of reaction is removed by cooling of the bottom of the tank.

Figure 2:
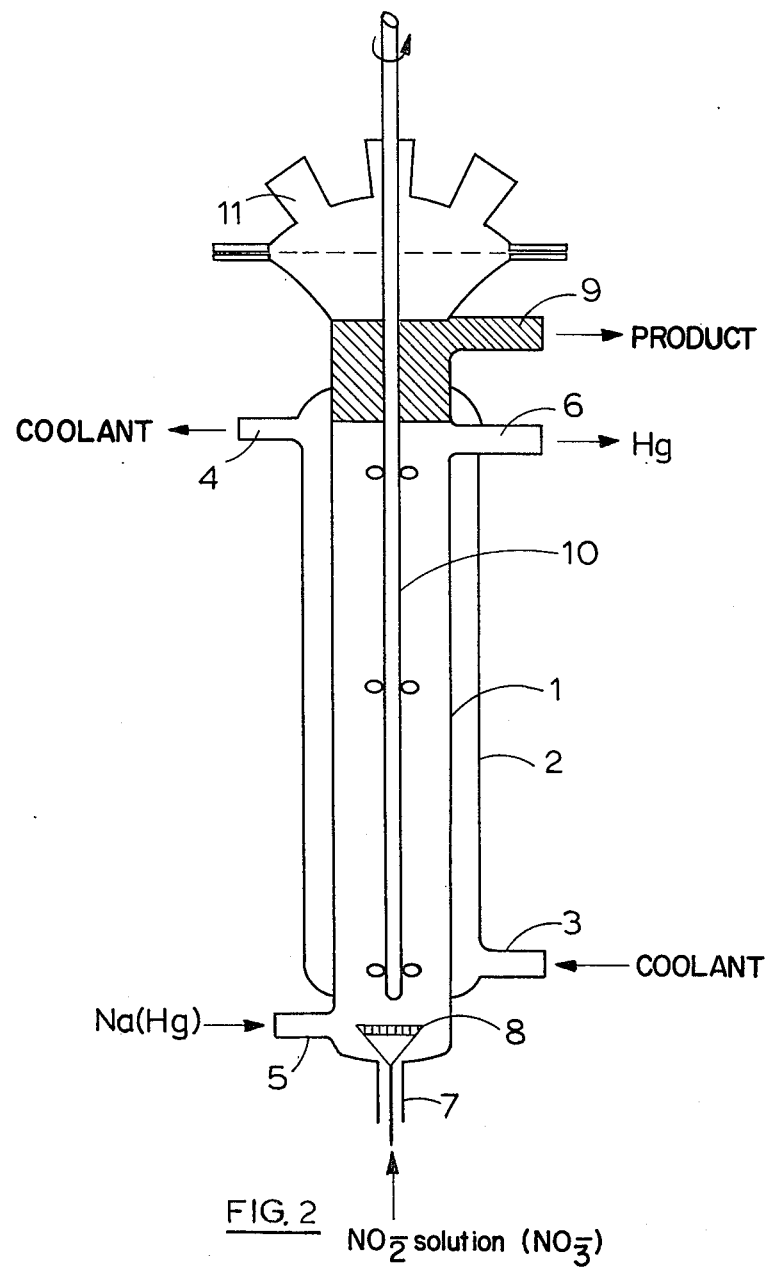

Embodiments occupying less space are shown in FIGS. 2–4.

In each of these cases the reactor is a vertical column 1, which, if desired, may be provided with a cooling jacket 2 with feed and discharge lines for the coolant, 3 and 4, respectively. FIG. 2 relates to a reactor in which amalgam is the continuous phase. In the situation shown in FIG. 2, liquid amalgam is supplied through line 5 and the Hg formed in the reaction is discharged through line 6. If the reactor is not fitted with cooling elements, the solution to be converted should previously be cooled to so low a temperature that a disadvantageous effect of the heat of reaction released is avoided.

The nitrite solution is supplied into the bottom of the column through line 7, and this solution is divided into drops by a perforated plate (8). The drops rise through the amalgam and the mercury, and collect in the top of the column to a stream of solution, which is discharged through line 9. A stirrer 10 is used to keep up a horizontal current in the column of amalgam, on account of which the solution is uniformly distributed. The gases evolved in the reaction issue through openings 11. FIGS. 3 and 4 relate to a reactor in which amalgam, as the disperse phase, is carried along by the solution.

In the mode of realization shown in FIG. 3 amalgam is supplied through line 5, the solution to be reduced through line 7. In injector 18 the solution supplied through line 7 entrains amalgam. An emulsion of mercury in the reduced solution, together with the gas that may have been evolved, is passed through line 9 to go to a separator (not shown), in which gas, mercury and solution are separated from each other.

In the mode of realization shown in FIG. 4, amalgam is supplied through line 5 and divided into drops by a perforated plate 28, which drops are carried along by the solution supplied as the continuous phase through line 7, to leave the reactor, together with this solution, through line 9, after which mercury and solution are separated in a separator which is not shown in the drawing. Instead of forming drops by means of a perforated plate, it is also possible to divide the amalgam into drops by spraying, by means of a gas or a liquid, in which case the amalgam is supplied through a central tube and the auxiliary gas, e.g. nitrogen, or the liquid, e.g. a nitrite solution to be reduced, through an outer tube fitted concentrically around the central one.

It should be remarked here that the alkali metal concentration in the amalgam has an influence on the efficiency that can be attained. By preference the highest possible concentration should be applied, subject to the limitation imposed by the requirement of the amalgam having to be kept liquid and pumpable. A concentration of 0.5% by weight of Na or K seems to be the upper limit.

For the efficiency to be reached it is hardly of any account whether nitrate ions or nitrite ions are present; however, the reduction of nitrate requires the use of an extra amount of amalgam, because this nitrate has first to be converted into nitrite.

In practice, the solutions to be reduced will often contain nitrate ions and nitrite ions side by side, because these solutions can be prepared in a technically simple way by absorption of nitrous gases in a hydroxide. The ratio between $NO_2$ and $NO$ in these gases determines the ratio between nitrite and nitrate in the resulting solution.

In conclusion, it can be said that the process according to the invention renders it possible to prepare, from cyclohexanon and nitrous gases, in combination with the electrolysis of chlorine-alkali compounds by means of mercury cells, cyclohexanone oxime, the basic material for the production of ε-caprolactam, without the production of by-product ammonium sulphate, in which respect this process differs from the known process, in which hydroxylamine is prepared by the Raschig synthesis. The alkali hydroxide required for the absorption of the nitrous gases is supplied by the electrolysis plant, in that part of the amalgam is decomposed with water; the remainder of the amalgam can then be used as reduction agent for nitrate and nitrite. The hydroxylamine formed in the process is immediately converted into the corresponding oxime by means of cyclohexanone. Eventually, there results a solution of oxime in alkali hydroxide, from which the oxime can be recovered by conversion of the hydroxide into soda or bicarbonate by means of $CO_2$.

What is claimed is:

1. A process of reducing alkali metal nitrate, alkali metal nitrite or mixtures thereof in an alkaline solution by treating the solution with a liquid alkali metal amalgam to produce hydroxylamine, the process being characterized by reducing said alkali metal nitrite, alkali metal nitrate or mixtures thereof in an aqueous solution of a solvent for said hydroxylamine and said alkali metal nitrate or alkali metal nitrite, said solvent selected from the group consisting of methyl alcohol, ethyl alcohol, propyl alcohol, glycols and glycol ethers with at most 3 carbon atoms.

2. Process according to claim 1, characterized in that the reactants alkali metal amalgam and solution containing nitrate or nitrite are contacted in co-current relation.

3. Process according to claim 2, characterized in that the supply of the alkali metal amalgam and the supply of the solution containing nitrate or nitrite ions are so adjusted with respect to each other that 6 atoms of alkali metal, in the form of amalgam, are present per mole of $NO_3^-$, and 4 atoms of alkali metal, in the form of amalgam, are present per mole of $NO_2^-$.

4. Process according to claim 1 characterized in that the amalgam contains about 0.4% by weight of alkali metal and the temperature is maintained at 0°–10°C, and in that the solution consists of methyl alcohol of 80% by vol., having dissolved therein per liter of solution
  2 moles of hydroxide,
  0.1 mole of alkali nitrite, and
  0.1 mole of cyclohexanone.

5. The process of claim 4 wherein alkali metal nitrite is reduced.

6. The process of claim 1 wherein alkali metal nitrite is reduced.

7. Process according to claim 1, characterized in that at least 20 parts by volume of organic solvent are present per 100 volumetric parts of water plus organic solvent.

8. In a process of reducing alkali metal nitrate, alkali metal nitrite or mixtures thereof in an alkaline solution by treating the solution with a liquid alkali metal amalgam to produce hydroxylamine, the improvement comprising the step of reducing said alkali metal nitrate, alkali metal nitrite or mixtures thereof in a solution of water and a solvent selected from the group consisting of methyl alcohol, ethyl alcohol, propyl alcohol, glycols and glycol ethers of up to 3 carbon atoms.

9. A process of reducing alkali metal nitrate or alkali metal nitrite in an alkaline solution by treating the solution with a liquid alkali metal amalgam to produce hydroxylamine, the process being characterized by reducing said alkali metal nitrite or alkali metal nitrate in an aqueous solution of a solvent for said hydroxylamine and said alkali metal nitrate or alkali metal nitrite, said solvent selected from the group consisting of methyl alcohol, ethyl alcohol, propyl alcohol, glycols and glycol ethers of at most 3 carbon atoms.

10. A process of reducing alkali metal nitrate or alkali nitrite in an alkaline solution by treating the solution with a liquid alkali metal amalgam to produce hydroxylamine, the process being characterized by reducing said alkali metal nitrite or alkali metal nitrate in an aqueous solution of $(CH_2)_4SO_2$.

* * * * *